United States Patent [19]
Koyama

[11] Patent Number: 5,003,602
[45] Date of Patent: Mar. 26, 1991

[54] SPEECH RECOGNITION LSI SYSTEM

[75] Inventor: Motoaki Koyama, Yokohama, Japan

[73] Assignee: Kabushiki Kaisha Toshiba, Kawasaki, Japan

[21] Appl. No.: 253,831

[22] Filed: Oct. 5, 1988

[30] Foreign Application Priority Data

Nov. 24, 1987 [JP] Japan .................................. 62-295666

[51] Int. Cl.$^5$ ............................................. G10L 5/00
[52] U.S. Cl. ..................................................... 381/43
[58] Field of Search .................................... 381/41–43

[56] References Cited

FOREIGN PATENT DOCUMENTS

WO86/02217 4/1986 World Int. Prop. O. .

OTHER PUBLICATIONS

J. Tsunoda et al., Speaker–Independent Isolated Word Recognition LSI Set, Toshiba Review, No. 159, Spring 1987, pp. 34–37.

S. Waser et al., Real–Time Processing Gains Ground with Fast Digital Multiplier, Electronics, vol. 50, No. 20, Sep. 29, 1977, pp. 93–99.

Primary Examiner—Emanuel S. Kemeny
Attorney, Agent, or Firm—Finnegan, Henderson, Farabow, Garrett and Dunner

[57] ABSTRACT

A speech recognition LSI system has a first sampling circuit which samples, at a first frame interval, which is shorter than ½fc (fc denotes the cut-off frequency of a low-pass filter in a speech processing section), an A/D conversion output signal in each frequency band of a speech input signal. Thereafter, the sampled data of a plurality of frames is stored in a digital low-pass filter where is smoothed. Output data which has been smoothed by the digital low-pass filter is then supplied to a second sampling circuit which in turn produces sampled data having a second frame interval, this being longer than ½fc. The sampled data sequentially supplied from the second sampling circuit is supplied to a recognition-processing unit to detect the speech segment. The matching degree between data in the detected speech segment and reference pattern data is detected and the recognition result for the speech input signal is derived out on the based of the magnitude of the similarities detected.

7 Claims, 4 Drawing Sheets

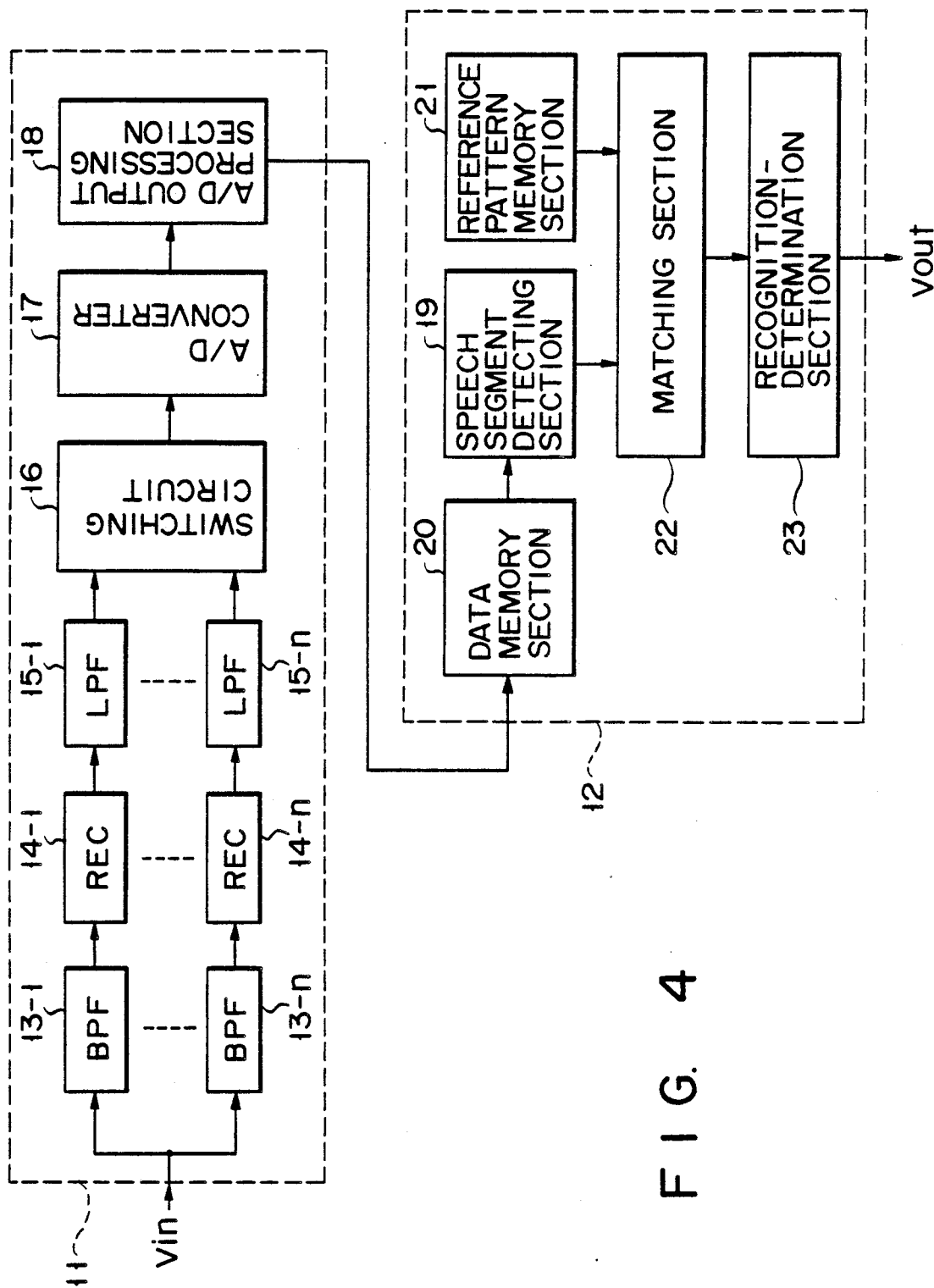
F I G. 4

SPEECH RECOGNITION LSI SYSTEM

BACKGROUND OF THE INVENTION

1. Field of the Invention

This invention relates to a speech recognition LSI system, and more particularly to an A/D output processing unit for converting a speech input signal into a digital signal and then sampling-processing the digital signal

2. Description of the Related Art

In a conventional speech recognition LSI system, a speech input signal is subjected to various speech processings—for example, rectification for respective frequency bands, selection of a low frequency band, and analog/digital conversion—and the result of a given processing is sampled at a constant frame period or interval as an acoustic characteristic parameter. The processing circuit for performing the above speech processings includes a plurality of band-pass filters having different frequency bands, rectifier circuits for rectifying outputs from the respective band-pass filters, low-pass filters for smoothing outputs of the respective rectifier circuits, a switching circuit for selecting outputs from the respective low-pass filters, an A/D converter for analog-digital (A/D) converting the output selected by the switching circuit, and a sampling circuit for sampling an output from the A/D converter.

When an output of the A/D converter is sampled at a frame interval (T) of, for example, 20 msec, it is then necessary to set the cut-off frequency (fc) of the low-pass filter at the preceding stage at less than 25 Hz ($\frac{1}{2}$ T). Otherwise, as indicated by the sampling theory, aliasing noise is added to sampled data. However, it is difficult to form the low-pass filter having cut-off frequency fc of 25 Hz in the LSI because it is necessary to form a capacitor with a large capacitance in order to form the low-pass filter having a low cut-off frequency. The capacitor with a large capacitance occupies a large area in the LSI. Further, it is necessary to form an insulation film with a thin and constant thickness as a capacitor insulation film, making the manufacturing process complex. For this reason, in the practical speech recognition LSI, cut-off frequency fc of the low-pass filter is set at approximately 50 Hz and the sampling frame interval is set shorter than 10 msec ($\frac{1}{2} \times 1/fc$) in order to enhance the reproductivity of the speech input signal.

However, if the sampling interval is set shorter than $\frac{1}{2}$ T, sampling data of a quantity larger than twice that obtained when the cut-off frequency is set at T can be obtained for the speech input signal of the same speech generation period of time. Therefore, the operation efficiency of a memory which is used for storing the sampling data and which is provided in a recognition processing circuit for checking the matching between the sampled data and reference patterns may be lowered, and the processing time for speech recognition may be increased.

SUMMARY OF THE INVENTION

An object of this invention is to provide a speech recognition LSI system in which substantially all the information included in the original signal can be preserved even after a sampling process has been effected using a frame interval longer than $\frac{1}{2}$fc or the inverse of twice the cut-off frequency fc of the low-pass filter of the speech processing circuit, the operation efficiency of a memory used in the recognition-processing circuit can be enhanced, and the processing time required for speech recognition can be reduced.

According to one embodiment of this invention, there is provided a speech recognition LSI system comprising a plurality of band-pass filters for dividing a speech input signal into a plurality of different frequency bands; rectifier circuits for rectifying outputs of the band-pass filters; low-pass filters for smoothing outputs of the rectifier circuits; an A/D converter for A/D converting outputs of the low-pass filters; a first sampling circuit for sampling an output of the A/D converter at a first frame interval; a digital low-pass filter for storing and smoothing a plurality of frames of data sampled by the first sampling circuit; a second sampling circuit for sampling an output of the digital low-pass filter at a second frame interval, longer than the first frame interval; and a recognition-processing circuit for detecting the speech segment of data serially supplied from the second sampling circuit, checking the degree of matching as regards the data in each speech segment and reference pattern data, to detect similarities therebetween, and recognizing the data in each speech segment, on the basis of magnitude of the similarities detected.

In the speech recognition LSI system of this invention, A/D converted outputs in respective frequency bands of an input speech signal are sampled at, the first frame interval, which is shorter than $\frac{1}{2}$fc (fc denotes a cut-off frequency of the low-pass filter in the speech processing circuit), after which the sampled data of a plurality of frames is stored. After the sampled data has been smoothed, it is sampled at the second frame interval, which is longer than $\frac{1}{2}$fc, and is then subjected to speech recognition processing.

Therefore, if cut-off frequency fc of the low-pass filter is constant, sampled data of a period longer than that of the conventional case can be obtained, with the result that the operating efficiency of the memory can be enhanced and the processing time of the speech recognition-processing circuit reduced. In other words, if the period of sampled data is constant, cut-off frequency fc of the low-pass filter can be set to higher than that in the conventional case, and thus the low-pass filter can be easily formed on the same chip. Further, since the digital low-pass filter is used to smooth sampled data of a plurality of frames, influence by white noise included in an output signal of the low-pass filter in the speech processing circuit can be reduced, thus enhancing the speech recognition accuracy.

According to the speech recognition LSI system of this invention, substantially all the information included in the original signal can be preserved even after the sampling process has been effected using a frame interval longer than $\frac{1}{2}$fc or half the cut-off frequency fc of the low-pass filter in the speech processing circuit, and therefore an amount of data input to the recognition-processing circuit can be made small. In this way, a speech recognition LSI system can be provided whereby the operating efficiency of the memory in the recognition-processing circuit can be enhanced and the processing time required for speech recognition reduced.

BRIEF DESCRIPTION OF THE DRAWINGS

FIGS. 4 and 5 are respectively block diagrams of speech recognition LSI systems according to second and third embodiments of this invention.

DETAILED DESCRIPTION OF THE PREFERRED EMBODIMENTS

Figure 1:
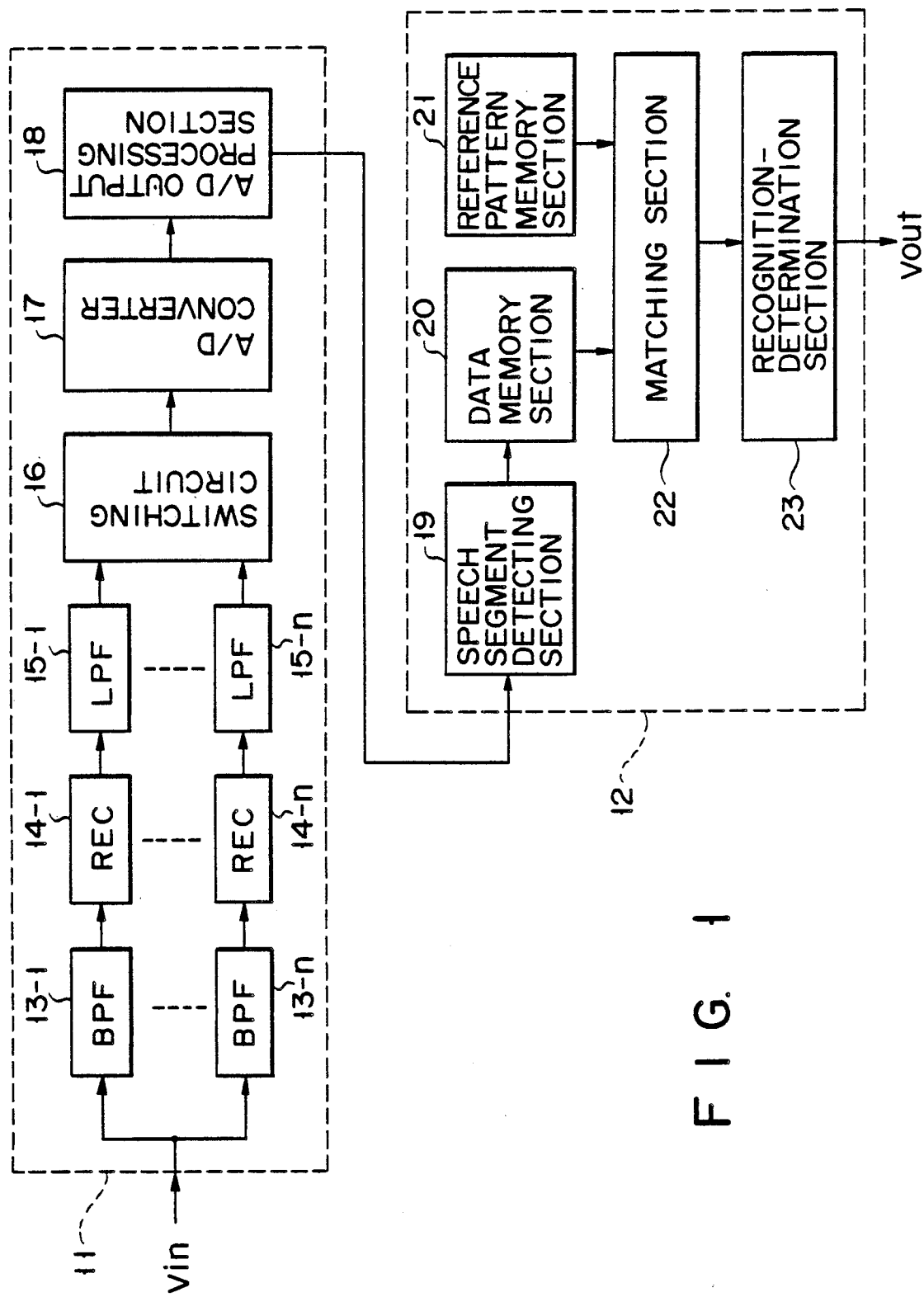
FIG. 1 is a block diagram of a speech recognition LSI system according to one embodiment of this invention.

FIG. 1 is a block diagram of a speech recognition LSI system according to one embodiment of this invention. This LSI system includes speech processing unit 11 and recognition-processing unit 12, both of which are in the LSI form. Speech processing unit 11 includes a plurality of band-pass filters (BPFs) 13-1 to 13-n having different frequency bands, rectifier circuits (RECs) 14-1 to 14-n for rectifying outputs of filters 13-1 to 13-n, low-pass filters (LPFs) 15-1 to 15-n for smoothing outputs of circuits 14-1 to 14-n, switching circuit 16 for selectively transmitting outputs of filters 15-1 to 15-n, A/D converter 17 for analog/digital (A/D) converting an output of a low-pass filter 15-j (j is an integer from 1 to n) selected by switching circuit 16, and A/D output processing section 18 for processing an output of A/D converter 17, which processing will be described later.

Recognition-processing unit 12 includes speech segment detecting section 19 for detecting the speech segment of time-sequential data supplied from speech processing unit 11, data memory section 20 for temporarily storing data in the speech segment detected by detecting section 19, reference pattern memory section 21 which stores reference pattern data used for speech recognition, matching section 22 for detecting the degree of matching as regards memory data stored in memory sections 20 and 21, and recognition-determination section 23 for recognizing speech data on the basis of the magnitude of the similarity obtained as a result of the matching operation performed by matching section 22.

Figure 2:
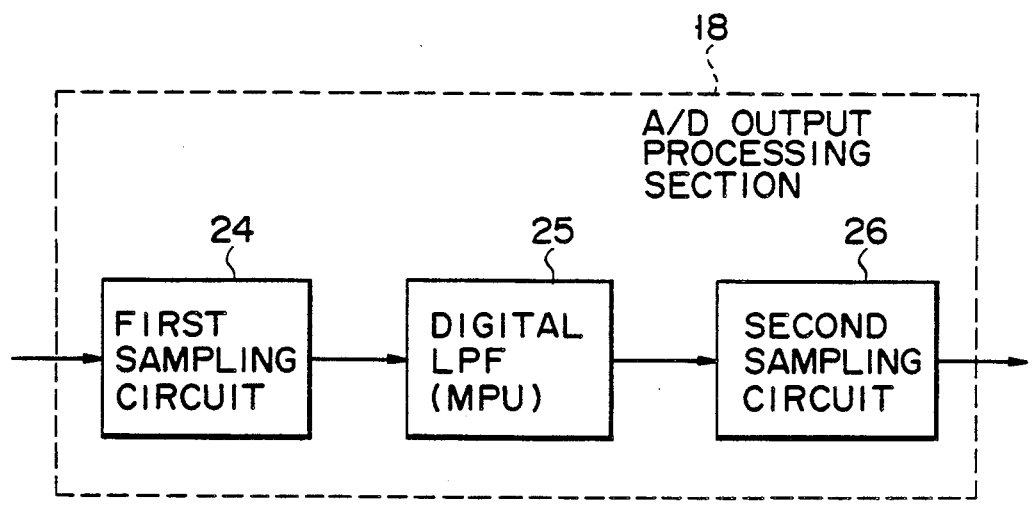
FIG. 2 is a block diagram showing the construction of an A/D output processing section contained in the LSI system shown in FIG. 1.

As is shown in FIG. 2, A/D output processing section 18 includes first sampling circuit 24, digital low-pass filter 25, and second sampling circuit 26. First sampling circuit 24 samples a digital signal from A/D converter 17 at frame period or interval T1 which is shorter than ½fc (fc denotes a cut-off frequency of low-pass filters 15-1 to 15-n). Digital low-pass filter 25 stores data of a plurality of frames sampled by first sampling circuit 24 and smoothes the sampled data of these frames. Second sampling circuit 26 samples an output of low-pass filter 25 at a frame interval T2 longer than ½fc.

Figure 3:
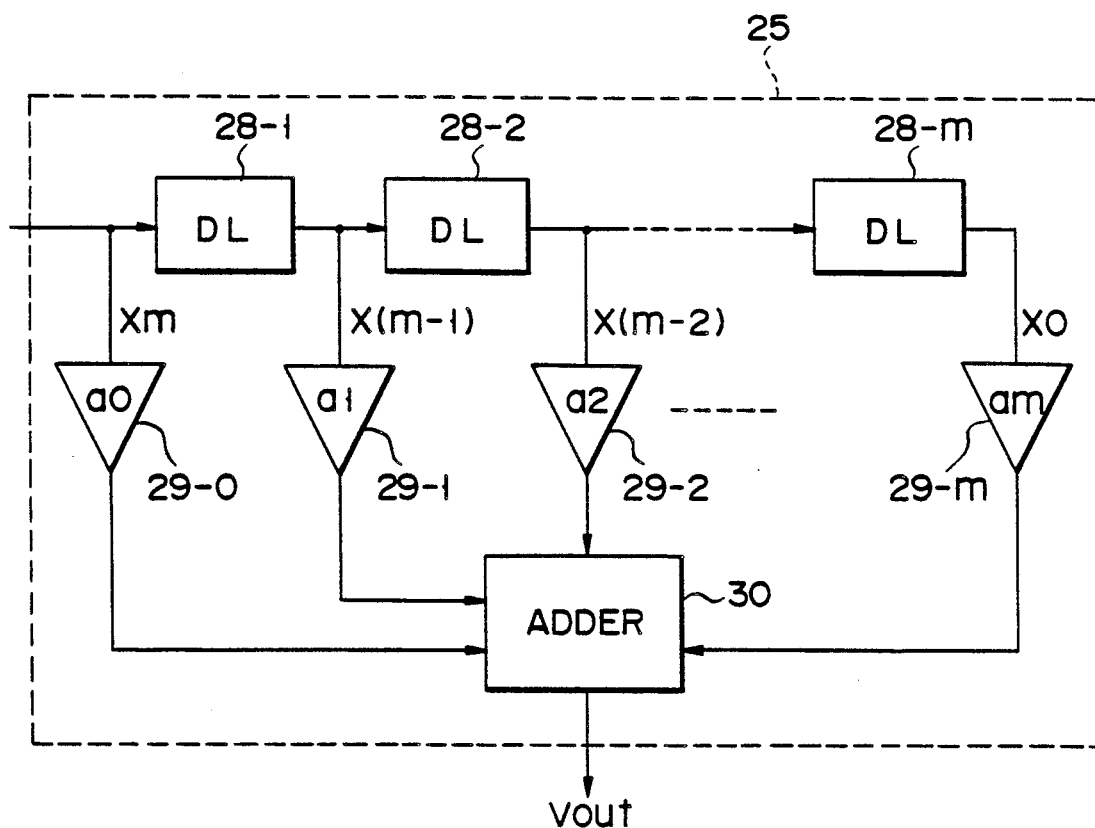
FIG. 3 is a block diagram showing the construction of a digital low-pass filter contained in the circuit of FIG. 2.

For example, digital low-pass filter 25 is constituted as shown in FIG. 3. In this filter, cascade-connected delay circuits (DLs) 28-1 to 28-m each have a delay time corresponding to frame interval T1. Delay circuit 28-1 at the first stage is connected to receive digital data which is supplied from A/D converter 17 and sampled by first sampling circuit 24. The delay circuits at the second and succeeding stages are respectively supplied with delay signals from delay circuits 28-1 to 28-m at the preceding stage. Multiplier circuits 29-0 to 29-m respectively multiply digital data from A/D converter 17 and delay signals Xi (i=m to 0) from respective delay circuits 28-1 to 28-m by coefficient ai (i=0 to m). Adder 30 adds together multiplied outputs from multiplier circuits 29-0 to 29-m, and supplies the following addition output (smoothed output):

$$\sum_{i=0}^{m} ai \cdot X(m - i)$$

The function of digital low-pass filter 25 can be attained by using a microprocessor (MPU) to process output data from first sampling circuit 24 by software. In this case, the processing is effected based on an adequate program to derive out a result corresponding to the above addition output.

The operation of the above speech recognition LSI system will now be explained.

First, speech input signal Vin is supplied to bandpass filters 13-1 to 13-n. Speech signals in respective frequency bands extracted by band-pass filters 13-1 to 13-n are supplied for rectification to rectifier circuits 14-1 to 14-n for the respective frequency bands. Output signals from rectifier circuits 14-1 to 14-n are respectively supplied to and smoothed by low-pass filters 15-1 to 15-n, and output signals of low-pass filters 15-1 to 15-n are supplied to switching circuit 16. An output signal from low-pass filters 15-j (j is an integer from 1 to n) selected by switching circuit 16 is supplied to A/D converter 17 via switching circuit 16 and converted into digital data. An output signal of A/D converter 17 is supplied to A/D output processing unit 18. In A/D output processing section 18, data from A/D converter 17 is sampled at frame interval T1 by first sampling circuit 24. Sampled data of a plurality of frames is supplied to and stored in digital low-pass filter 25, and then smoothed. Data smoothed by digital low-pass filter 25 is sampled at interval T2 longer than interval T1 by sampling circuit 26. An output signal of second sampling circuit 26, that is, an output signal of the A/D output processing section 18 is supplied to speech segment detecting section 19, and thus the speech segment of the time-sequential data from A/D output processing section 18 is detected. Data in the speech segment detected by speech segment detecting section 19 is temporarily stored in data memory section 20. The data in the speech segment stored in data memory section 20 and reference pattern data stored in reference pattern memory section 21 for speech recognition are supplied to matching section 22, and matching process for the stored data of memory sections 20 and 21 is effected. An output signal of matching section 22 is supplied to recognition-determination section 23 which in turn generates an output signal of recognition result Vout based on the magnitude of the similarities obtained as the result of the matching process in matching section 22.

After switching circuit 16 selects a different one of low-pass filters 15-1 to 15-n, the same process as described above is effected. In this way, outputs of low-pass filters 15-1 to 15-n are sequentially processed, and when all the outputs of low-pass filters 15-1 to 15-n are processed, the speech recognition is completed.

In the speech recognition LSI system described above, an A/D conversion output is sampled at frame interval T1, the sampled data of a plurality of frames is stored and smoothed, and then the smoothed data is sampled at interval T2 longer than frame interval T1. Therefore, the recognition processing for a small amount of data can be effected without causing substantial loss of information included in the original signal. As a result, the operation efficiency of the memory in recognition-processing unit 12 can be enhanced and the processing time for the speech recognition reduced. Further, since an A/D conversion output is smoothed by digital low-pass filter 25, influence by white noise included in an output signal of low-pass filters 15-1 to 15-n at the preceding stage of A/D converter 17 can be suppressed, thus enhancing the speech recognition accuracy.

This invention is not limited to the embodiment described above, and the LSI system can be constituted as shown in FIG. 4, for example. Portions in the circuit of FIG. 4 which are the same as those in the circuit of FIG. 1 are denoted,. by the same reference numerals, and the detailed explanation thereof is omitted. In recognition-processing unit 12, input data from A/D output processing section 18 is temporarily stored in data memory section 20, and data in each speech segment is detected by speech segment detecting section 19 based on the data stored in data memory section 20. With this construction, the basic effect and operation as those attained in the circuit of FIG. 1 can be attained.

Figure 5:
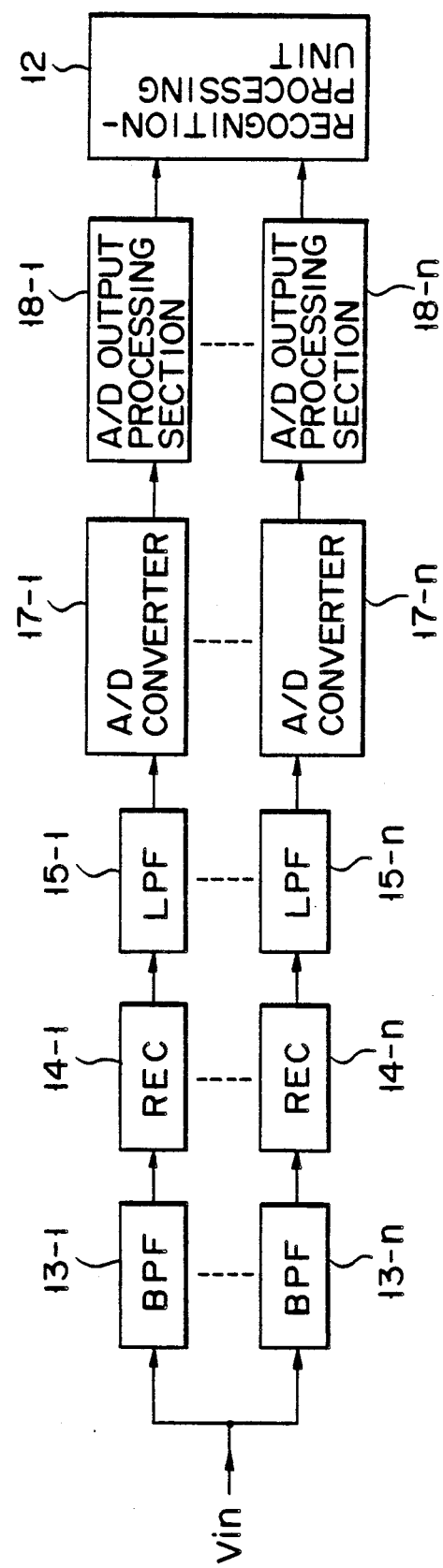

FIG. 5 shows still another embodiment of this invention. In the circuit of FIG. 5, speech processing unit 11 is formed to include a plurality of A/D converters 17-1 to 17-n for A/D converting corresponding output data of low-pass filters 15-1 to 15-n for respective frequency bands and A/D output processing sections 18-1 to 18-n respectively connected to output terminals of A/D converters 17-1 to 17-n. Output signals of A/D output processing sections 18-1 to 18-n are supplied to recognition-processing unit 12 shown in FIG. 1 or 4.

With this construction, speech signals in respective frequency bands are A/D converted in parallel, enhancing the processing speed of the speech recognition.

In the above embodiments, speech processing unit 11 and recognition-processing unit 12 are shown to be formed in different LSIs, but it is of course possible to form them in the same LSI.

What is claimed is:

1. A speech recognition LSI comprising:
a plurality of band-pass filters for dividing a speech input signal into a plurality of different frequency bands;
rectifier circuits for rectifying outputs of said band-pass filters;
low-pass filters for smoothing outputs of said rectifier circuit, each having a cut-off frequency;
A/D converter means for A/D converting outputs of said low-pass filter;
first sampling means for sampling an output of said A/D converter means at a first frame interval;
digital low-pass filter means for storing and smoothing a plurality of frames of data samples by said first sampling means;
second sampling means for sampling an output of said digital low-pass filter means at a second frame interval, longer than the first frame interval, the first frame interval in the first sampling means being shorter than ½fc when the cut-off frequency of the low-pass filters is fc, and the second frame interval in the second sampling means being longer than ½fc; and
recognition-processing means for detecting the speech segment of data time-sequentially supplied from said second sampling means, checking the matching as regards the data in each speech segment and reference pattern data, to detect similarities therebetween, and recognizing the data in each speech segment, on the basis of magnitude of the similarities detected.

2. A speech recognition LSI system according to claim 1, wherein said A/D converter means includes a switching circuit for selecting one of the output signals of said low-pass filters and an A/D converter for A/D converting one from among output signals of said low-pass filters selected by said switching circuit.

3. A speech recognition LSI system according to claim 1, wherein said A/D converter means includes a plurality of A/D converters to which are supplied output signals of said low-pass filters; and said A/D output processing means includes a plurality of A/D output processing sections to which are respectively supplied output signals of said plurality of A/D converters.

4. A speech recognition LSI system according to claim 1, wherein said digital low-pass filter means is attained by means of an MPU which is operated according to a predetermined program.

5. A speech recognition LSI system according to claim 1, wherein said digital low-pass filter means includes delay means having a delay time equal to the first frame interval in said first sampling means, multiplier means for multiplying an output signal of said first sampling means and delay outputs of said delay means by preset coefficients, and adding means for adding together output signals of said multiplier means.

6. A speech recognition LSI system according to claim 1, wherein said recognition-processing means includes a speech segment detecting section for detecting the speech segment of data time-sequentially supplied from said A/D output processing section, a data memory section for temporarily storing data in the speech segment detected by said speech segment detecting section, a reference pattern memory section which stores reference pattern data used for speech recognition, a matching section for detecting the degree of matching as regards data stored in said data memory section and said reference pattern memory section, and a recognition-determination section for deriving the recognition result on the basis of the magnitude of similarity detected in the matching-checking operation performed by said matching section.

7. A speech recognition LSI system according to claim 1, wherein said recognition-processing means includes a data memory section for storing data time-sequentially supplied from said A/D output processing section, a speech segment detecting section for detecting the speech segment of the time-sequential data stored in said data memory section, a reference pattern memory section which stores reference pattern data used for speech recognition, a matching section for detecting the degree of matching as regards an output of said speech segment detecting section and data stored in said reference pattern memory section, and a recognition-determination section for deriving the recognition result, on the basis of the magnitude of similarity detected in the matching-checking operation performed by said matching section.

* * * * *

UNITED STATES PATENT AND TRADEMARK OFFICE
CERTIFICATE OF CORRECTION

PATENT NO. : 5,003,602
DATED : March 26, 1991
INVENTOR(S) : Motoaki Koyama

It is certified that error appears in the above-identified patent and that said Letters Patent is hereby corrected as shown below:

Claim 1, column 5, line 47, change "circuit" to --circuits--.

Claim 1, column 5, line 48, change "filter" to --filters--.

Abstract, line 8, after "where" insert --it--.

Signed and Sealed this

Thirtieth Day of March, 1993

Attest:

STEPHEN G. KUNIN

*Attesting Officer*   *Acting Commissioner of Patents and Trademarks*